United States Patent [19]

Fujiwara

[11] Patent Number: 4,756,018
[45] Date of Patent: Jul. 5, 1988

[54] MULTIPLE ACCESS COMMUNICATION SYSTEM HAVING LOOP-CHECK CIRCUITRY FOR SWITCHING INTRAOFFICE CONNECTIONS

[75] Inventor: Ryuhei Fujiwara, Tokyo, Japan
[73] Assignee: NEC Corporation, Japan
[21] Appl. No.: 34,221
[22] Filed: Apr. 2, 1987
[30] Foreign Application Priority Data Apr. 5, 1986 [JP] Japan .................................. 61-77540

[51] Int. Cl.⁴ ............................................ H04M 7/00
[52] U.S. Cl. ...................................... 379/58; 379/221; 379/222; 379/115
[58] Field of Search ................. 379/58, 221, 334, 335, 379/333, 222, 115

[56] References Cited

U.S. PATENT DOCUMENTS 4,616,108 10/1986 Yamaguchi et al. ................... 379/58

Primary Examiner—James L. Dwyer
Attorney, Agent, or Firm—Laff, Whitesel, Conte & Saret

[57] ABSTRACT

A multiple access communication system comprises a central station connected to an end office switching system and a remote station which serves N subscriber telephones through respective line interface circuits. The remote station provides concentration by switching N subscriber interface circuits to M (where M is smaller than N) trunk circuits which are connected through transmission facilities to M trunk circuits of the central station. The central station provides deconcentration by switching its M trunk circuits to end-office N subscriber line interface circuits. In response to a called subscriber line interface circuit answering an intraoffice call, a long distance loop connection is established throughout the system by way of the end office between remote station subscribers for charging purposes and the remote station identifies the terminal location of the called circuit. Each remote-station line circuit includes a tone detector. A loop check circuit applies a tone signal to the long distance connection from the identified location of the called circuit to allow it to be detected by the detector of the calling line circuit. In response to detection of the tone signal, the remote station identifies the terminal location of the calling line circuit and establishes a local connection between the identified terminal locations and clears the long distance connection.

12 Claims, 8 Drawing Sheets

SUBSCRIBER LINE INTERFACE CIRCUIT 3

FSK DEMODULATOR

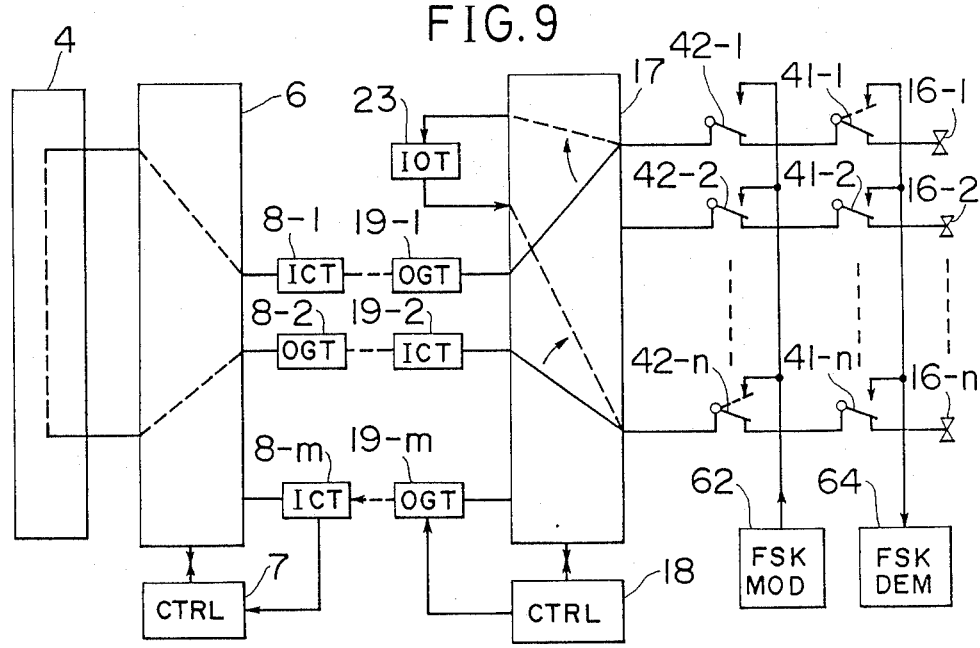

MULTIPLE ACCESS COMMUNICATION SYSTEM HAVING LOOP-CHECK CIRCUITRY FOR SWITCHING INTRAOFFICE CONNECTIONS

BACKGROUND OF THE INVENTION

The present invention relates to a multiple access communication system which provides concentration at a remote station by switching subscriber telephones to a smaller number of transmission facilities and provides deconcentration at a central station by switching the transmission facilities to the subscriber line terminals of an end-office telecommunication switching system.

A multiple access communication system as shown and described in Japanese Patent No. 59-154828 comprises a central station and a plurality of remote stations each serving telephone subscribers. The central station is connected to each remote station by radio channels which are smaller in number than the subscribers of each remote station. Each remote station is provided with all switching functions necessary for providing switched connections for outgoing, incoming and intraoffice calls. These functions are implemented by a memory for storing dialed information, a decoder for translating the dialed information to determine a desired route to the central station and other complex circuitry. However, if the system of this type is to be connected to an end office (a telephone office at the lowest level of the hierarchy of a public telephone network) to serve as a "line concentrator" between the end office and the subscribers, each subscriber must have a corresponding line terminal in that end office. In such applications, all intraoffice calls must be routed through the radio transmission channels and folded back through the end office switching network to establish a connection between two subscribers for purposes of charging. For efficient utilization of the valuable common channels, the system disconnects the fold-back connection, establishes a local connection in the remote station and switches the calling and called subscribers to the local connection when the called telephone goes off-hook. However, each remote station must additionally be provided with a subscriber memory for storing call status information to detect intraoffice calls and identify the line numbers of the subscribers of intraoffice calls, and other memories for storing administrative information which requires frequent visits by skilled personnel for management purposes.

SUMMARY OF THE INVENTION

It is therefore an object of the present invention to provide a multiple access communication system which simplifies remote station circuitry by applying a loop check signal to one end of a long distance connection which is established between subscribers of the same remote station for charging purposes and detecting the signal at the other end to switch the subscribers to a local connection.

Specifically, the multiple access communication system of the present invention comprises a central station connected to a telecommunication switching system and a remote station connected to it by transmission facilities. The central station includes N line interface circuits respectively connected to subscriber line terminals of the switching system and accessible through a switching matrix to M trunk circuits (where M is smaller than N) which are in turn connected respectively to the transmission facilities. A central-station controller controls the switching matrix to establish switched connections between the line interface circuits and the trunk circuits in response to a call received from the telecommunication switching system and remote station. In the remote station, M trunk circuits are connected respectively to the central-station trunk circuits through the transmission facilities and are accessible through a switching matrix to N line interface circuits which are respectively connected to subscriber telephones. Each remote-station line interface circuit is provided with a detector for detecting a tone signal. A remote-station controller controls the remote-station switching matrix to establish switched connections between the remote-station line interface circuits and the remote-station trunk circuits. In response to a called telephone going off-hook upon receipt of an intraoffice call, a long distance loop connection is established through the transmission facilities and telecommunication switching system for charging purposes and the remote-station controller identifies the location of the line circuit of the called telephone in the remote-station switching matrix. A tone signal is then applied to one end of the long distance connection. The detector of the line circuit from which the intraoffice call has originated detects the tone signal and communicates this fact to the remote station controller to allow it to identify its location in the remote-station switching matrix and proceed to establish a local connection through the remote-station switching matrix between the identified locations and clear the long distance connection.

BRIEF DESCRIPTION OF THE DRAWINGS

The present invention will be described in further detail with reference to the accompanying drawings, in which:

FIG. 2 is a circuit diagram of a subscriber line interface circuit of FIG. 1a;

FIG. 9 is a schematic illustration useful for describing the operation of the system.

DETAILED DESCRIPTION

Figure 1A:
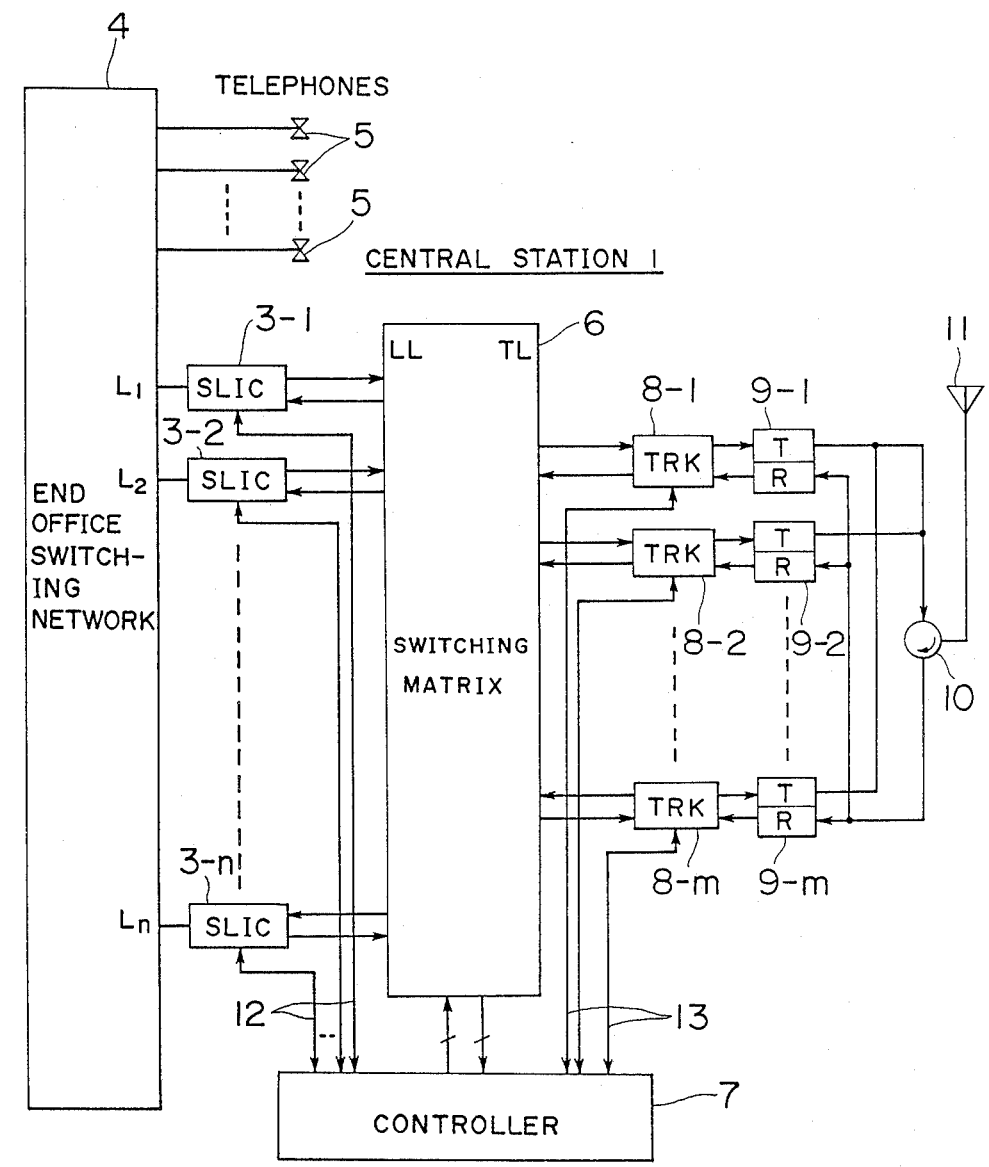
FIGS. 1a and 1b are block diagrams of a multiple access radio telephone system according to the present invention.
Figure 1B:
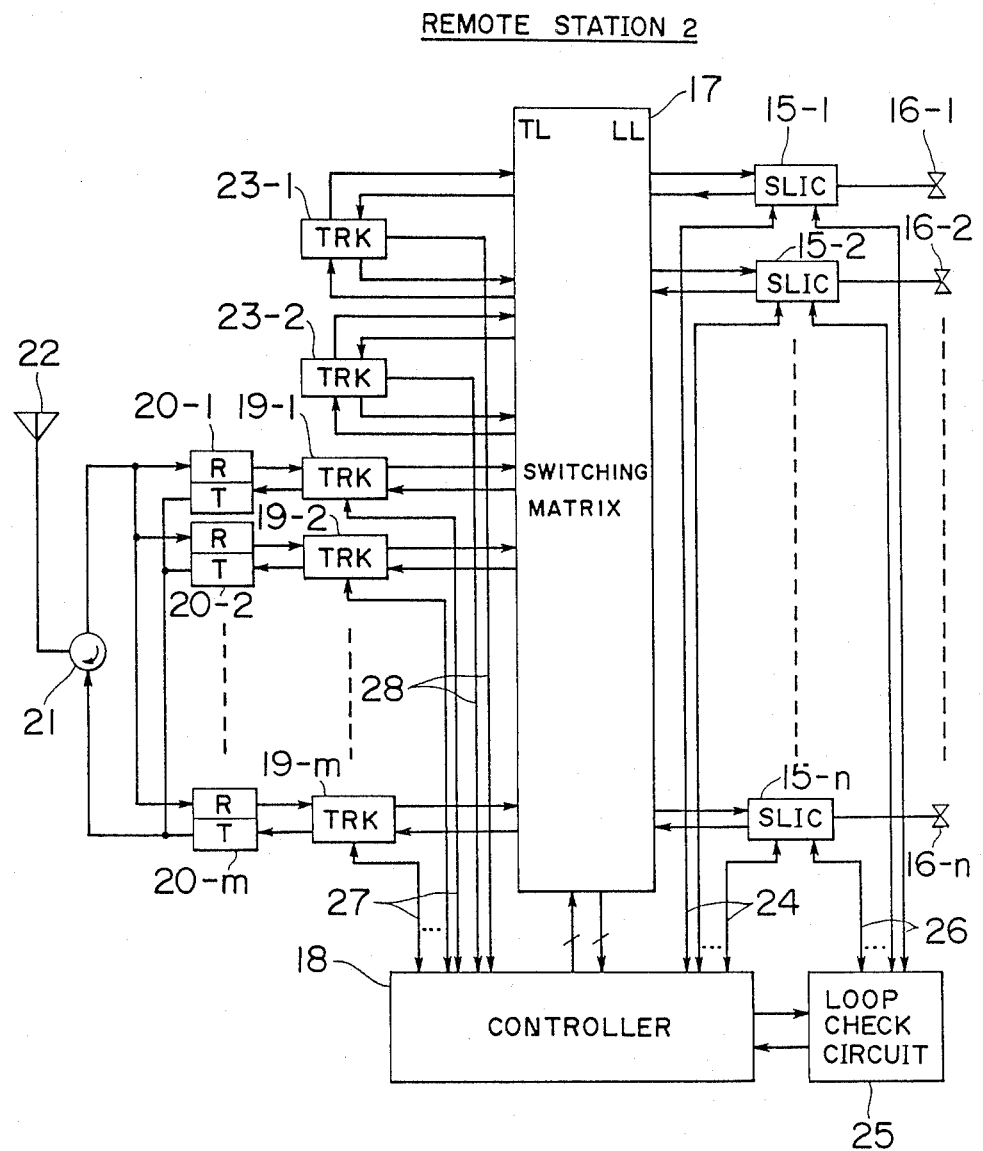

Referring now to FIGS. 1A and 1B, there is shown a multiple access radio telephone system according to an embodiment of the present invention. The system generally comprises a central station 1 and a remote station 2 which are interconnected by radio transmission facilities. Central station 1 is located in an end office of the public telephone network and includes a plurality of subscriber line interface circuits 3-1 to 3-n having two-wire terminals and four-wire terminals. The two-wire terminals of the interface circuits are connected respectively to their associated subscriber line terminals $L_1$ through $L_n$ of the end office switching network 4 which also serves ordinary telephones 5. The four-wire terminals of the interface circuits 3 are connected to the line link terminals of a four-wire switching matrix 6 which is controlled by a controller 7.

As viewed from the end office switching network 4, the switching matrix 6 provides concentration by switching the line interface circuits 3 to a smaller number of commonly shared two-way radio channels and as viewed in the opposite direction it provides deconcentration by switching the radio channels to the line circuits 3. Subscriber line interface circuits 3 are switched to the radio channels through four-wire interoffice (outgoing, incoming and/or two-way) trunk circuits 8-1 through 8-$m$ (where m is smaller than n) which are connected to the trunk link terminals of the switching matrix 6. The two-way radio channels are established by transceiver units 9-1 through 9-$m$ each having an RF (radio frequency) transmitter and an RF receiver connected respectively to the associated trunk circuit 8. The outputs of the RF transmitters are connected together to the input of a duplexer 10 and the inputs of the RF receivers are connected together to the output of duplexer 10. The common output of duplexer 10 is connected to an antenna 11 for transmission and reception of frequency-division multiplexed radio signals.

Subscriber line interface circuits 3 are associated with the controller 7 through respective control paths 12 for processing call origination and termination and for line number detection. Trunk circuits 8 are likewise associated with controller 7 through control paths 13 for trunk selection and signaling. Controller 7 selects a link within the switching matrix 6 after a set of a particular subscriber line interface circuit and a particular trunk circuit has been determined to establish a connection therebetween and controls the transfer of signaling information between subscriber line interface circuits 3 and trunk circuits 8 before the link is established in the switching matrix 6. Controller 7 has a basic memory which is updated on a per call basis to store line and trunk numbers of each connection established through the switching matrix 6 for purposes such as clearing a connection at the end of a call.

Remote station 2 comprises a plurality of subscriber line interface circuits 15-1 through 15-$n$ having two-wire terminals and four-wire terminals similar to the end office subscriber line interface circuits 3. The two-wire terminals of line interface circuits 15 are connected to subscriber telephone sets 16-1 through 16-$n$ respectively and their four-wire terminals are connected to the line link terminals of a switching matrix 17 which is controlled by a controller 18.

To the trunk link terminals of switching matrix 17 are connected four-wire interoffice trunk circuits 19-1 through 19-$m$ which are associated with transceiver units 20-1 through 20-$m$, respectively. Transceivers 20-1 to 20-$m$ are connected to a duplexer 21 and thence to an antenna 22 in a manner similar to the central station transceivers to establish two-way radio channels to the central station 1. Further connected to the trunk link terminals of switching matrix 17 are four-wire intraoffice trunk circuits 23-1 and 23-2 which can be provided as many as required depending on the amount of intraoffice calls among the subscribers of the same remote station.

As in the central station, subscriber line interface circuits 15 are associated with the controller 18 through control paths 24 for call origination, call termination and line number identification and interoffice trunk circuits 19 are associated with it through control paths 27 for trunk selection and signaling. Intraoffice trunk circuits 23 are associated with the controller 18 through control paths 28 for trunk selection. Similar to the central station controller 7, controller 18 selects a link within the switching matrix 17 after a set of a particular subscriber line interface circuit and a particular trunk circuit has been determined to establish a connection therebetween and controls the transfer of signaling information between subscriber line interface circuits 15 and interoffice trunk circuits 19 before the connection is established in the switching matrix 17. Similar to controller 7, the remote controller 18 has a basic memory which is updated on a per call basis to store line and trunk numbers of each connection established through the switching matrix 17 for call clearing operations.

Figure 8:
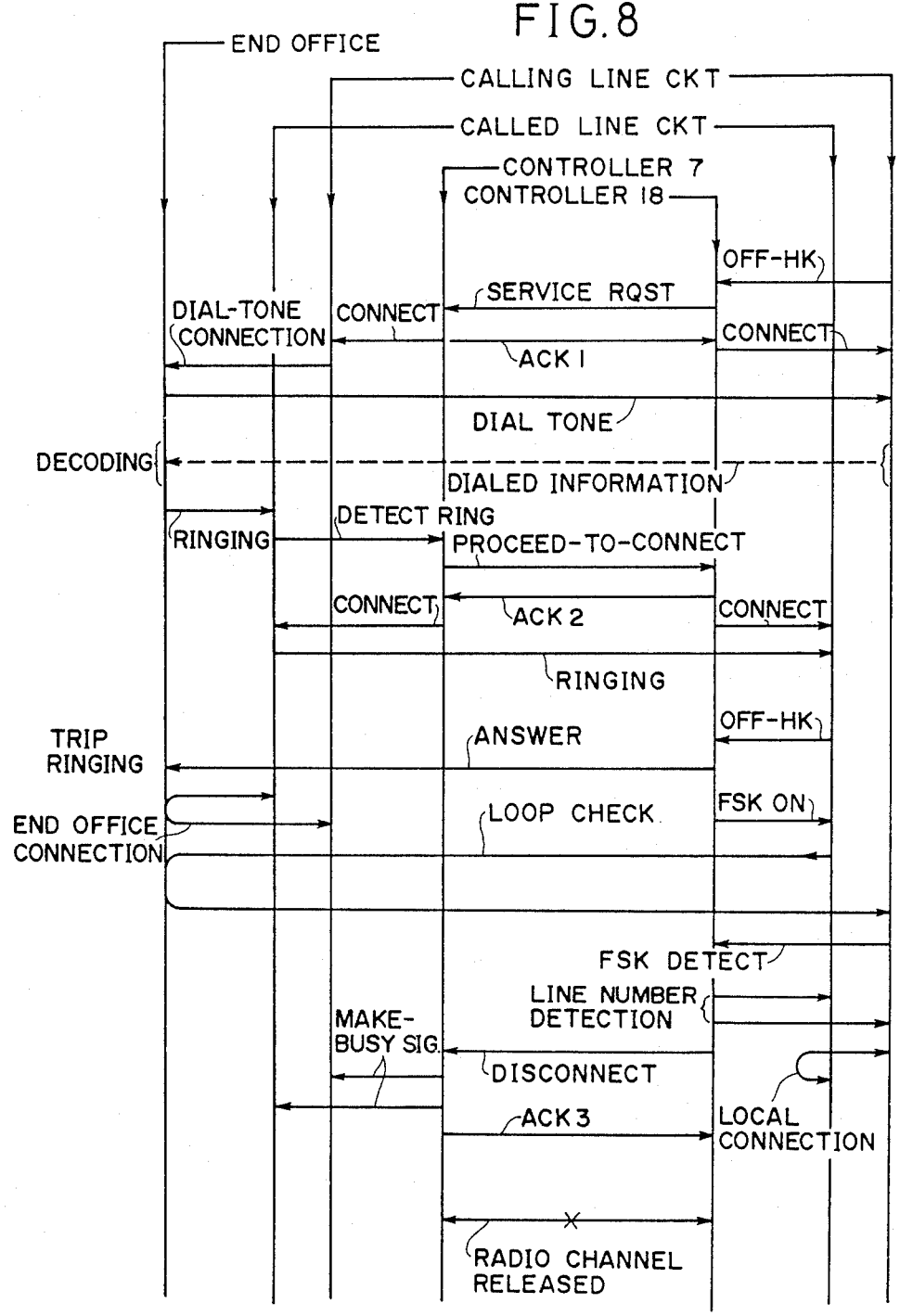
FIG. 8 is a time diagram illustrating a sequence of events involved in an intraoffice call.

The following is a brief description of the operation of the system with reference to FIG. 8 when an intraoffice call is originated from telephone 16-1 to telephone 16-$n$. When telephone 16-1 goes off-hook for call origination, a service request signal is applied from the associated line interface circuit 15-1 to the controller 18 which in turn selects the outgoing (or two-way) trunk circuit 19-1, for example, to relay this signal over the associated radio channel and the corresponding incoming (or two-way) trunk circuit 8-1 at the central station to its controller 7. Central station controller 7 controls the switching matrix 6 to establish a connection between the calling party line interface circuit 3-1 and the incoming trunk circuit 8-1 to form a "dc" loop across the associated line terminals of the switching network 4 to establish a dial-tone connection and returns an acknowledgement (ACK1) to the remote station controller 18. In response to this acknowledgement, the controller 18 controls the switching matrix 17 to connect the calling party line interface circuit 15-1 to the outgoing trunk circuit 19-1 to allow the calling party to receive dial tone sent from the end office switching system. A dialed selection signal is received from the calling party and transmitted over the established connections through the the switching matrices 17 and 6 and is decoded by the end office switching system. A switched connection will then be established through the end office switching network 4 to the called end-office line interface circuit 3-$n$ to send a ringing signal to it. This ringing signal is detected by the line interface circuit 3-$n$ which communicates this fact to controller 7 and regenerates a ringing signal of an out-of-band frequency to be transmitted to the called party telephone 16-$n$ at the remote station 2. Controller 7, recognizing that a call is being received, selects the outgoing trunk circuit 8-2, for example, and sends a proceed-to-connect signal (including the last digit of the called party, for example) through the outgoing trunk circuit 8-2 and the associated incoming trunk circuit 19-2 to controller 18, which returns an acknowledgement (ACK2) to the central station controller 7 to allow it to connect the selected outgoing trunk circuit 8-2 to the called party line interface circuit 3-$n$. Controller 18 proceeds to connect the incoming trunk circuit 19-2 to the called party line circuit 15-$n$ to pass the ringing signal regenerated by the end-office line circuit 3-$n$ to the remote station line circuit 15-$n$ where it is detected and a ringing signal at an in-band frequency is regenerated and sent to telephone 16-$n$ to activate its tone ringer. When the called-party telephone 16-$n$ goes off-hook in response to this ringing signal, the latter is tripped by the called-party line circuit 15-$n$ and an answer signal is returned therefrom to the end-office line circuit 3-$n$ to form a "dc" loop across the end-office line terminals of the called party subscriber 16-n to trip the end-office ringing signal.

In accordance with the present invention, a loop check circuit 25 is connected to the remote line interface circuits 15-1 through 15-n through control paths 26. As will be described in detail later, the loop check circuit 25 generates a loop check signal briefly when telephone 16-n goes off-hook and applies it through the called line interface circuit 15-n to the calling party line interface circuit 15-1. If a calling subscriber belongs to the same remote station, the loop check signal will be returned to the loop check circuit 25 and checked against a particular code format to detect a match between them. If there is a match between them, loop check circuit 25 communicates this fact to the controller 18 to cause it to identify the line terminals (corresponding to telephone numbers) of the calling and called parties to set up a local connection between them through a selected one of the intraoffice trunk circuits 23 and send a disconnect signal to central station controller 7 through a path which may be routed by trunk circuits 19-m and 8-m. Central station controller 7 applies a make-busy signal to the line circuits 3-1 and 3-n of the calling and called parties, releases the trunk circuit 8-1 and 8-2 and returns an acknowledgement (ACK3) through trunk circuit 8-m to the remote station to allow it to release the trunk circuits 19-1 and 19-2.

Figure 2:
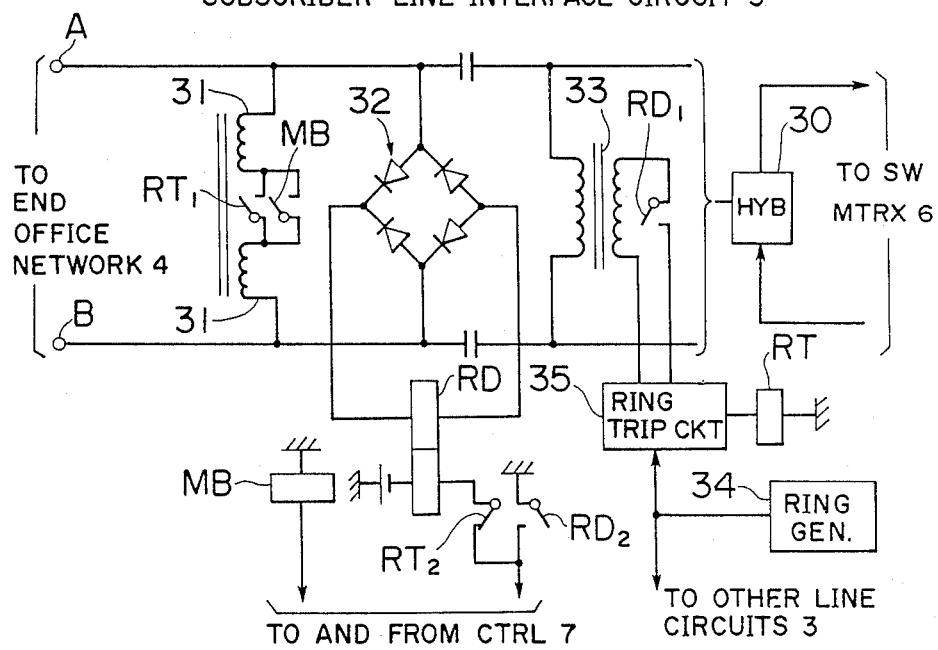

For a full understanding of the present invention, reference is now made to FIGS. 2 to 9. In FIG. 2, each of the central station line interface circuits 3 comprises a hybrid coil 30 of which the four-wire circuits are connected to the associated four-wire line link terminals of switching matrix 6. The two-wire circuit of hybrid coil 30 is connected to the A- and B-line (tip and ring lines) of the switching network 4. Across the two-wire circuit of the hybrid coil 30 is connected a pair of high-impedance transformers 31 (but relatively low impedance for DC current) which are interconnected when a normally open contact $RT_1$ of a ring trip relay RT is closed. The RT relay is connected to a ring trip circuit 35 to trip the end-office ringing signal when a called party goes off-hook. A relay MB is provided to respond to a control signal supplied from the controller 7 when it receives a make-busy signal from the remote station when a local connection is to be established and outgoing and incoming connections are to be disconnected. The make-busy relay MB has a contact MB connected in parallel with the contact $RT_1$ to couple the transformers 31 together when the make-busy signal is applied to the MB relay. A bridged-diode circuit 32 is connected in parallel with the choke coils 31 to activate a ring detect relay RD. The secondary winding of a transformer 33 is connected across the two-wire circuit of the hybrid coil 30. A first contact $RD_1$ of relay RD is connected in the primary of transformer 33 to apply an out-of-band ringing signal from a ringing generator 34 through ring trip circuit 35 to the two-wire hybrid circuit. The ring detect relay RD has a second, normally closed contact $RD_2$ which applies a ground potential to the controller 7 to inform it of the arrival of a call to a holding circuit of the relay RD through a second contact $RT_2$ of the ring trip relay RT. Ring detect relay RD thus remains energized after it is operated in receipt of a ringing signal from the end-office switching system until the ring trip relay RT is operated.

Figure 3:
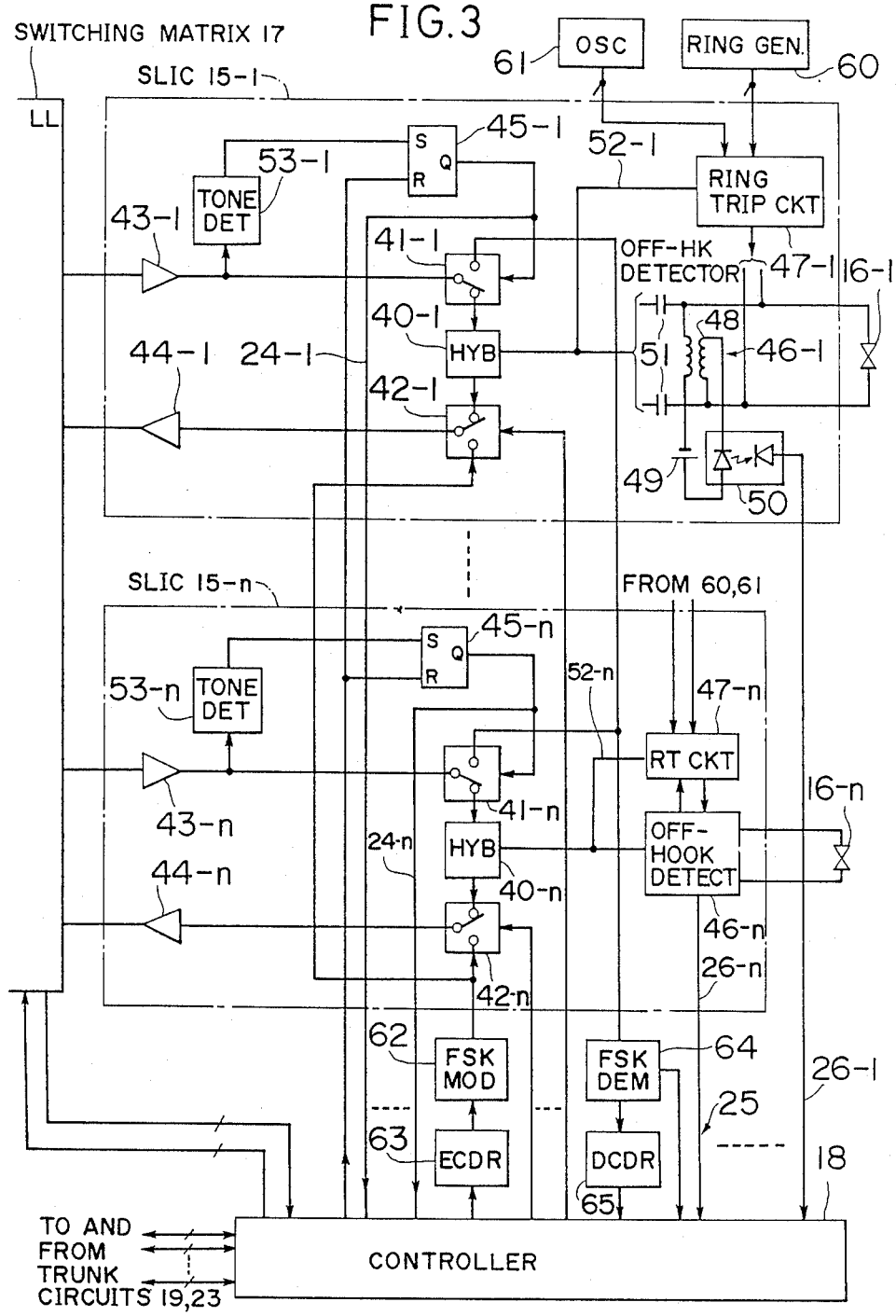
FIG. 3 is a block diagram of subscriber line interface circuits of FIG. 1b.

Referring to FIG. 3 in which details of each remote subscriber line circuit 15 and associated circuits are shown. For purposes of disclosure, line circuits 15-1 and 15-n are exemplarily shown. Loop check circuit 25 generally comprises an FSK (frequency shift keying) modulator 62, an encoder 63 which supplies a coded pulse signal to the modulator 62 to generate a coded tone signal, an FSK demodulator 64 which demodulates the coded tone signal to recover the original pulse signal and a decoder 65. Decoder 65 checks the recovered pulse signal with a code format assigned uniquely to the remote station and supplies an output signal to the controller 18 if there is a match between them. The assignment of a particular code format to each remote station is to prevent interference which can occur between different remote stations.

Each line circuit 15 comprises a hybrid coil 40 which forms a four-wire circuit with switches 41 and 42 and buffer amplifiers 43 and 44 so that a signal appearing at the associated two-wire line-link terminal of matrix 17 is passed through buffer amplifier 43 and switch 41 to the two-wire input of hybrid coil 40 in the absence of a switching signal from a flip-flop 45 and a signal appearing at the two-wire output of hybrid coil 40 is passed through switch 42 and through buffer amplifier 44 to the outgoing two-wire line-link terminal of matrix 17 in the absence of a switching signal from the controller 18. The two-wire common terminal of hybrid coil 40 is connected to an off-hook detector 46 and a ring trip circuit 47. Off-hook detector 46 comprises a transformer 48 which connected in series with a DC source 49 and the light-emitting diode of a photocoupler 50 across the subscriber loop. Capacitors 51 isolate the hybrid coil 40 from the DC source 49. When the associated telephone goes off-hook, the light-emitting diode of photocoupler 49 is excited by a loop current and its photodiode supplies a signal to the controller 18 to inform it of an off-hook condition. Ring trip circuit 47 receives the out-of-band ringing signal through line 52 to couple an in-band ringing signal from a common source 60 to a called telephone. When it goes off-hook, the ring trip circuit 47 operates and switches the input line 52 to a common oscillator 61 to return an out-of-band answer signal briefly to the associated end-office line circuit 3 to cause its ring trip circuit 35 to operate, closing the contact $RT_1$.

Switch 42 is operated by the controller 18 when it recognizes an off-hook status of the associated telephone and applies a coded tone signal from FSK modulator 62 to buffer amplifier 44. A tone detector 53 is connected to the output of buffer amplifier 43 to detect the arrival of a coded tone signal which is sent from a called party. When this tone signal is detected, flip-flop 45 is triggered and a switching control signal is applied therefrom to switch 41, which in turn couples the tone signal to FSK demodulator 64. The switching signal from flip-flop 45 is also applied to the controller 18 on path 24 to permit the controller 18 to detect the calling party line number.

More specifically, assume that an intraoffice connection has been established between telephones 16-1 and 16-n by way of the end office switching network 4 with the trunk circuits 19-1 and 19-2 being involved in the connection as schematically shown in FIG. 9. In this case, the switch 42-n of the called-party line circuit 15-n is operated by the controller 18 as it senses the application of a signal on line 26-n from off-hook detector 46-n when telephone 16-n goes off-hook in response to a ringing signal supplied from ringing generator 60 through ring trip circuit 47-n. The operation of switch 42-n applies the coded tone signal of the FSK modulator 62 to amplifier 44-n. This tone signal propagates through the transmit path of the called party and eventually enters the receive path of the calling-party line circuit 15-1, whereupon it is detected by the tone detector 53-1 which sets the flip-flop 45-1 to activate the switch 41-1, forming a path between the FSK modulator 62 and FSK demodulator 64.

If the controller 18 receives a signal from the decoder 65, it recognizes that the call just arrived at the called-party line circuit 15-n has originated from the same remote station. Controller 18 proceeds to detect the line numbers of both parties from the location of the line 24-1 on which it receives the output of flip-flop 45-1 and from the location of the line 26-n on which it receives the off-hook signal from the called party and removes the coded tone signal by releasing switch 42-n and resetting the flip-flop 45-1. Controller 18 then selects an idle outgoing trunk circuit 19-m (FIG. 9) and transmits through it a "disconnect" signal to the central station 1 where it is detected by the incoming trunk circuit 8-m and supplied to the controller 7, which in turn sends back an acknowledgement (ACK3) to the remote controller 18. This disconnect signal includes information on the address numbers of the calling and called parties and an instruction to operate the make-busy relay MB of the line circuits 3 of both parties. Almost simultaneously with the transmission of the disconnect signal, the remote controller 18 selects an idle intraoffice trunk circuit 23 (FIG. 9) and establishes a local connection as indicated. In response to the acknowledgement (ACK3) sent from the controller 7 over trunk circuits 8-m and 19-m, the controller 18 releases the previous outgoing connection to trunk circuit 19-1 and the previous incoming connection from trunk circuit 19-2.

Figure 4:
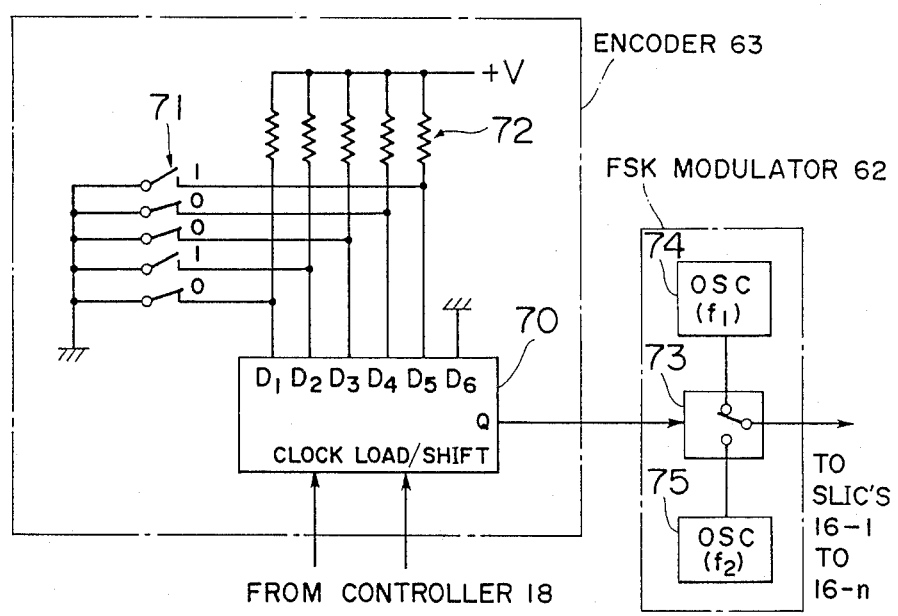
FIG. 4 is a circuit diagram of a loop check encoder and an FSK modulator.
Figure 5:
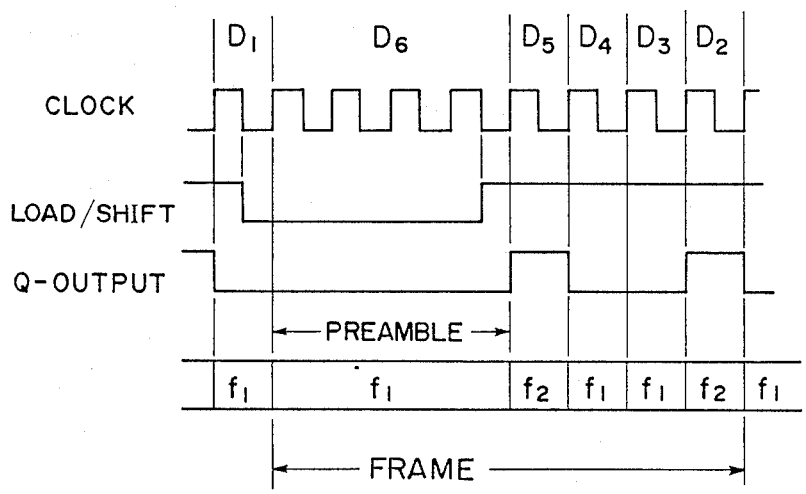
FIG. 5 is a time diagram associated with FIG. 4.

FIGS. 4 to 7 are illustrations of details of the FSK modulator 62 with the associated encoder 63 and details of the FSK demodulator 64. In FIG. 4, encoder 63 comprises a shift register 70 having binary stages D1 through D6. A code switches 71 are connected to the binary stages D1 to D5 which are also connected by resistors 72 to a voltage source. The binary stage D6 is grounded. Code switches 71 are manually operated to apply a particular set of binary 1's and 0's. A train of clock pulses and a load/shift signal (FIG. 5) are applied from the controller 18 to the associated input terminals of shift register 70. If the code switches 71 are operated so that binary stages D1 through D5 are loaded respectively with binary states "0", "1", "0", "0" and "1", the Q output of shift register 70 will appear as indicated in FIG. 5. The Q output of shift register 70 is applied to the control terminal of an electronic switch 73 of the modulator 62 to selectively couple the output of switch 73 to oscillators 74 and 75 having frequencies f1 and f2, respectively. The output of switch 73 is coupled to all the line interface circuits 16. The frequency of the modulator 62 alternates between f1 and f2 during a period following a "preamble" in which the frequency is constant at f1. This preamble is provided to enable the tone detectors 53 to detect the arrival of a coded loop check signal.

Figure 6:
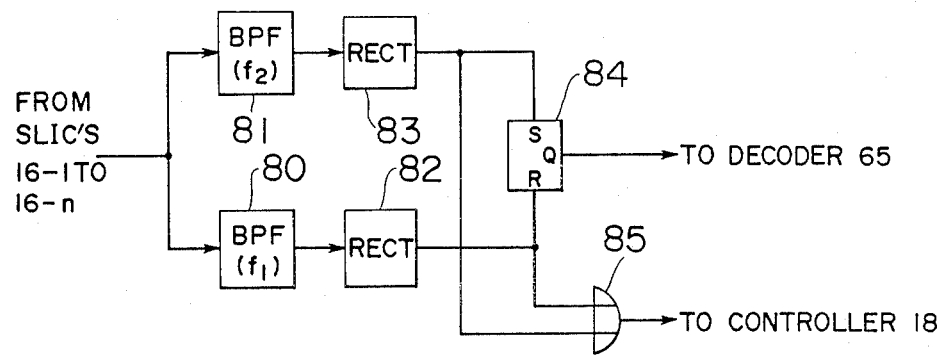
FIG. 6 is a circuit diagram of an FSK demodulator.
Figure 7:
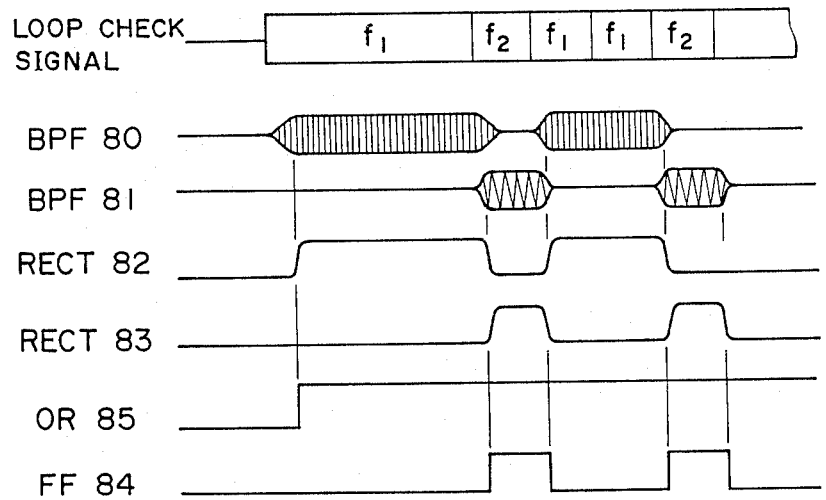
FIG. 7 is a time diagram associated with FIG. 5.

In FIG. 6, FSK demodulator 64 includes band-pass filters 80 and 81 having center frequencies f1 and f2 and rectifier circuits 82 and 83 respectively connected to the outputs of band-pass filters 80 and 81. The outputs of rectifier circuits 82 and 83 are connected to the reset and set inputs of a flip-flop 84 to generate an output which is a replica of the original binary signal and applied to the decoder 65. These outputs are also applied to an OR gate 85 to generate a loop-check presence signal that continues as long as the loop check signal is present at the the input of the FSK demodulator 64 (FIG. 7). This loop-check presence signal is applied to the controller 18 to enable it to be in readiness to accept an output signal from the decoder 65.

What is claimed is:

1. A multiple access communication system having a central station connected to a telecommunication switching system and a remote station, each of said stations having a switching means, comprising:

N central-station line interface circuits respectively connected to subscriber line terminals of said switching system and terminated at the central-station switching means and M central-station trunk circuits, where M is smaller than N, connected respectively to transmission facilities and terminated at said central-station switching means;

central-station control means associated with said line interface circuits and said trunk circuits for causing said central-station switching means to establish switched connections therein;

M remote-station trunk circuits connected respectively to the central-station trunk circuits through said transmission facilities and N remote-station line interface circuits respectively connected to subscriber telephones, each of the remote-station line interface circuits having a detector for detecting a loop check signal;

remote-station control means associated with said remote-station line interface circuits and said remote-station trunk circuits for causing the remote-station switching means to establish switched connections therein; and loop check means associated with said remote-station line interface circuits for applying said loop check signal to one end of a connection established between two of said remote-station line interface circuits via said transmission facilities and said switching system to receive a signal from the detector of one of said remote-station line interface circuits which is connected to the other end of said connection and causing said remote-station controller to identify the last-mentioned line interface circuits to cause said remote-station switching means to establish a local connection therebetween and clear the first-mentioned connection.

2. A multiple access communication system as claimed in claim 1, wherein said loop check signal is a coded tone signal and wherein said loop check means detects when said coded tone signal matches a predetermined code format to cause said remote-station switching means to effect the clearing of the first-mentioned connection and the establishment of said local connection.

3. A multiple access communication system as claimed in claim 2, wherein said loop check means comprises a coding circuit for generating said coded tone signal unique to said remote station.

4. A multiple access communication system as claimed in claim 2, wherein said coded tone signal is an FSK (frequency shift keying) modulated signal, and wherein said loop check means includes an FSK demodulator for demodulating the modulated signal which returns through the first-mentioned connection.

5. A multiple access communication system as claimed in claim 1, wherein each of said remote-station line interface circuits comprises:
- off-hook detector means for detecting when an associated telephone goes off-hook; and
- switch means for coupling said loop check signal from said loop check means to said one end of said connection in response to the detection of the off-hook condition by said off-hook detector means and coupling said other end of said connection to said loop check means in response to the detection of said loop-check signal by the own detector.

6. A multiple access communication system as claimed in claim 1, wherein said transmission facilities are radio transmission facilities, and each of said remote-station line interface circuits comprises:
- off-hook detector means for detecting when an associated telephone goes off-hook;
- a receive circuit;
- a transmit circuit; and
- switch means for coupling said loop check signal from said loop check means to said transmit circuit in response to the detection of the off-hook condition by said off-hook detector means and coupling said receive circuit to said loop check means in response to the detection of said loop check signal by the own detector.

7. A multiple access communication system as claimed in claim 6, wherein each of said receive and transmit circuits includes a buffer amplifier.

8. A multiple access communication system as claimed in claim 1, wherein each of said central-station line interface circuits comprises:
- ring detector means for detecting arrival of a ringing signal from said switching system;
- means for regenerating a second ringing signal in response to the detection of said ringing signal by said ring detector and applying it to a connection established through said transmission facilities;
- ring trip means for tripping said regenerated ringing signal in response to a signal from said remote station and providing a "dc" loop at the associated subscriber line terminal of said switching system; and
- means for providing a "dc" loop at said associated subscriber line terminal in response to the establishment of said local connection.

9. A multiple access communication system as claimed in claim 1, further comprising an intraoffice trunk circuit through which said local connection is established.

10. A multiple access communication system as claimed in claim 1, wherein said loop check signal is applied to a called end of said first-mentioned connection.

11. A multiple access communication system having a switching means with terminals to which line interface circuits are connected, said switching means being connected to a telecommunication switching system, comprising:
- first means for identifying the terminal locations of said line interface circuits and establishing a long distance loop connection between calling and called line interface circuits through said switching means and said telecommunication switching system to send a ringing signal to the called line interface circuit;
- second means in each of said line interface circuits for detecting when said called line interface circuit answers said ringing signal and causing said first means to identify the terminal location of the called line interface circuit in said switching means;
- third means in each of said line interface circuits for detecting a loop check signal; and
- fourth means for applying said loop check signal to said long distance connection from the identified location of said called line interface circuit to allow the loop check signal to be detected by said third means of the calling line interface circuit and causing said first means to identify the terminal location of the calling line interface circuit in said switching means and establish a local connection through said switching means between the identified terminal locations and disconnect said long distance connection.

12. A method for determining the specified locations of calling and called line interface circuits in a switching means which is connected to a telecommunication switching system, comprising:
- establishing a long distance connection between said line interface circuits through said switching means and said telecommunication switching system to send a ringing signal to said called line interface circuit;
- detecting when said called line interface circuit answers said ringing signal to identify the specified location of the called line interface circuit in said switching means;
- applying a loop check signal to said long distance connection from the identified location of said called line interface circuit;
- causing said loop check signal to be detected by the calling line interface circuit to identify the specified location thereof in said switching means; and
- establishing a local connection through said switching means between said calling and called line interface circuit and disconnecting the long distance connection.

* * * * *